US010022573B2

(12) United States Patent
Jones et al.

(10) Patent No.: US 10,022,573 B2
(45) Date of Patent: Jul. 17, 2018

(54) FALL ARREST SYSTEM SAFETY DEVICE

(71) Applicant: Latchways PLC, Devizes, Wiltshire (GB)

(72) Inventors: Karl Jones, Devizes (GB); Owain Jones, Chippenham (GB)

(73) Assignee: Latchways PLC, Devizes (GB)

( * ) Notice: Subject to any disclaimer, the term of this patent is extended or adjusted under 35 U.S.C. 154(b) by 215 days.

(21) Appl. No.: 14/618,452

(22) Filed: Feb. 10, 2015

(65) Prior Publication Data
US 2015/0217151 A1 Aug. 6, 2015

Related U.S. Application Data

(63) Continuation of application No. 12/682,684, filed as application No. PCT/GB2008/003465 on Oct. 10, 2008, now Pat. No. 8,950,551.

(30) Foreign Application Priority Data

Oct. 12, 2007 (WO) ................ PCT/GB2007/003885
Aug. 8, 2008 (GB) ................................... 0814526.0

(51) Int. Cl.
*A62B 35/00* (2006.01)
*A62B 35/04* (2006.01)
*F16F 7/12* (2006.01)

(52) U.S. Cl.
CPC .......... *A62B 35/04* (2013.01); *A62B 35/0093* (2013.01); *F16F 7/123* (2013.01)

(58) Field of Classification Search
CPC ..... A62B 35/0093; A62B 35/04; A62B 35/00; A62B 35/99
(Continued)

(56) References Cited

U.S. PATENT DOCUMENTS 2,546,202 A * 3/1951 Trouin ............... A62B 35/0093
188/180
2,896,912 A * 7/1959 Faugier .............. A62B 35/0093
182/237
(Continued)

FOREIGN PATENT DOCUMENTS

EP 0247818 A2 12/1987
GB 1445480 A 8/1976
(Continued)

OTHER PUBLICATIONS

International Search Report for PCT/GB2007/003885 dated Apr. 7, 2008.
(Continued)

*Primary Examiner* — Daniel P Cahn
(74) *Attorney, Agent, or Firm* — Gordon & Jacobson, P.C.

(57) ABSTRACT

A safety device for use in a fall arrest system, has a safety line drum mounted for rotation and a speed responsive engagement mechanism responsive to the speed of rotation of the drum, which is activated above a predetermined rotational speed of the drum to deploy an energy absorber. A rotational transmission member (which may be in the form of a shaft) is coupled, via the speed responsive engagement mechanism, when activated, to rotate with the drum. The energy absorber is deployed in response to operation of the rotational transmission member. The speed responsive engagement mechanism may be mounted intermediate the drum and the energy absorber for ease of replacement.

21 Claims, 7 Drawing Sheets

(58) Field of Classification Search
USPC ............... 182/231, 232, 234, 236, 237, 239; 188/371, 376, 377; 293/132, 133; 242/374, 383, 383.2
See application file for complete search history.

(56) References Cited

U.S. PATENT DOCUMENTS

| | | | |
|---|---|---|---|
| 3,561,690 A | 2/1971 | Muskat | |
| 3,715,144 A * | 2/1973 | Minolla | B60R 22/28 297/472 |
| 3,946,989 A * | 3/1976 | Tsuda | A62B 1/10 182/241 |
| 4,088,201 A * | 5/1978 | MacFarlane | A62B 1/12 182/5 |
| 4,437,546 A * | 3/1984 | Marinoff | A62B 1/12 182/233 |
| 4,511,123 A | 4/1985 | Ostrobrod | |
| 4,722,422 A * | 2/1988 | Hiraoka | A62B 1/12 182/233 |
| 4,846,313 A | 7/1989 | Sharp | |
| 5,186,289 A * | 2/1993 | Wolner | A62B 1/12 182/232 |
| 5,220,977 A * | 6/1993 | Wolner | A62B 35/0037 182/18 |
| 5,332,071 A * | 7/1994 | Duncan | A62B 35/04 188/371 |
| 5,351,906 A * | 10/1994 | Feathers | A62B 1/10 182/237 |
| 5,447,280 A | 9/1995 | Feathers | |
| 5,618,006 A * | 4/1997 | Sayles | B60R 22/3413 242/379.1 |
| 5,722,612 A * | 3/1998 | Feathers | A62B 35/0093 192/103 C |
| 5,829,548 A | 11/1998 | Ostrobrod | |
| 5,934,597 A | 8/1999 | Ludwig | |
| 6,042,042 A | 3/2000 | Fujii et al. | |
| 6,279,682 B1 * | 8/2001 | Feathers | A62B 35/0093 182/239 |
| 7,104,371 B2 * | 9/2006 | Renton | A62B 35/04 182/36 |
| 7,281,620 B2 | 10/2007 | Wolner et al. | |
| 8,052,080 B2 * | 11/2011 | Liang | B66D 5/16 242/371 |
| 8,181,744 B2 | 5/2012 | Parker et al. | |
| 8,256,574 B2 * | 9/2012 | Griffiths | A62B 1/08 182/234 |
| 8,893,854 B2 * | 11/2014 | Casebolt | 182/235 |
| 8,925,687 B2 * | 1/2015 | Meillet | A62B 35/0093 182/230 |
| 8,950,551 B2 | 2/2015 | Jones et al. | |
| 2003/0136610 A1 * | 7/2003 | Sato | A62B 1/12 182/238 |
| 2004/0055824 A1 * | 3/2004 | Karnes | A62B 1/10 182/234 |
| 2004/0182963 A1 * | 9/2004 | Mori | B60R 22/46 242/374 |
| 2006/0021825 A1 | 2/2006 | An et al. | |
| 2007/0107984 A1 * | 5/2007 | Bissett | A62B 1/20 182/3 |
| 2009/0032785 A1 * | 2/2009 | Jones | A62B 35/0093 254/274 |
| 2009/0078505 A1 * | 3/2009 | Casebolt | A62B 35/0093 182/231 |
| 2009/0178887 A1 * | 7/2009 | Reeves | A62B 1/10 182/239 |
| 2009/0211847 A1 * | 8/2009 | Balquist | A62B 35/0093 182/231 |
| 2010/0236867 A1 * | 9/2010 | Jones | A62B 35/0093 182/231 |
| 2011/0084158 A1 * | 4/2011 | Meillet | A62B 1/08 242/385.4 |
| 2011/0100766 A1 * | 5/2011 | Auston | A62B 35/0093 188/65.1 |
| 2011/0209948 A1 * | 9/2011 | Auston | A62B 35/0093 182/232 |
| 2011/0278095 A1 * | 11/2011 | Hetrich | A62B 1/10 182/231 |
| 2012/0118670 A1 * | 5/2012 | Olson | A62B 1/10 182/232 |
| 2012/0145481 A1 * | 6/2012 | Jones | A62B 35/0093 182/231 |
| 2014/0251731 A1 * | 9/2014 | Jones | A62B 35/04 182/231 |

FOREIGN PATENT DOCUMENTS

| | | |
|---|---|---|
| WO | WO0146601 A1 | 6/2001 |
| WO | WO 2007/057636 A1 | 5/2007 |
| WO | WO2008/007119 A1 | 1/2008 |

OTHER PUBLICATIONS

International Search report for PCT/GB2008/003465 dated Sep. 4, 2009.
Written Opinion of the International Search Authority for PCT/GB2007/003885 dated Apr. 13, 2010.
Written Opinion of the International Search Authority for PCT/GB2008/003465 dated Apr. 13, 2010.
Response to Office Action dated Jul. 24, 2013 in U.S. Appl. No. 12/682,753 submitted on Jan. 24, 2014.
Office Action dated Feb. 5, 2014 in U.S. Appl. No. 12/682,753.

* cited by examiner

FALL ARREST SYSTEM SAFETY DEVICE

BACKGROUND OF THE INVENTION

1. Field

The present invention relates to a fall arrest system safety device and in particular to a device including a drum upon which a safety line is used including an energy absorber arrangement to absorb the energy of a fall arrest event.

2. State of the Art

Fall arrest systems are used to prevent personnel working at height from suffering injury as a result of falling. Fall arrest systems are often referred to as height safety systems or fall prevention systems. Frequently such systems include a so called safety block arranged to be suspended overhead from an anchor structure. Such arrangements typically include a drum upon which a safety line is wound; a speed responsive mechanism arranged to inhibit the drum rotation above a predetermined rotational speed and an energy absorber device arranged to be activated if a load above a predetermined threshold is deployed when the speed responsive mechanism is deployed. The energy absorber devices are typically either friction brake devices or plastically deformable metallic strip arrangements that are plastically deformed during deployment in order to absorb energy.

SUMMARY OF THE INVENTION

An improved arrangement has now been devised.

According to a first aspect, the present invention provides a safety device for use in a fall arrest system, the safety device comprising:
  an energy absorber arrangement;
  a safety line drum mounted for rotation;
  a speed responsive engagement mechanism responsive to the speed of rotation of the drum, which is activated, above a predetermined rotational speed of the drum;
  a rotational transmission member, which transmission member is coupled, via the speed responsive engagement mechanism, when activated, to rotate with the drum; the energy absorber arrangement being activated in response to operation of the rotational transmission member.

The transmission member is typically a shaft which is coupled so as to rotate in unison with the drum only when the speed responsive engagement mechanism is engaged. Accordingly it is preferred that the transmission member comprises a shaft and preferably that the drum is arranged in a first movement regime to rotate independently of and about the shaft; and in a second movement regime to rotate in unison with the shaft.

The drum is preferably mounted on the shaft and provided with bearings permitting the drum to rotate independently about the shaft in the first movement regime.

The speed responsive engagement mechanism is preferably positioned intermediate the drum and the energy absorber arrangement. In this way the energy absorber is mounted outboard the speed responsive engagement mechanism. This enables the energy absorber to be removed and replaced without dismantling of the speed responsive engagement mechanism.

Consequently, according to a further aspect, the invention provides a safety device comprising:
  a support shaft;
  an energy absorber arrangement mounted on the shaft;
  a safety line drum mounted for rotation;
  a speed responsive engagement mechanism responsive to the speed of rotation of the drum and at least a portion of which is carried by the shaft and, which is activated, above a predetermined rotational speed of the drum in order to couple rotation of the drum to the energy absorber arrangement;
  wherein the speed responsive engagement mechanism arrangement is mounted intermediate the drum and the energy absorber arrangement.

In either embodiment it is preferred that the transmission member comprises a shaft and the shaft has a portion arranged to cooperate with the energy absorber to deploy or operate the energy absorber.

It is preferred that the respective portion of the shaft engages with a drive member comprising the energy absorber arrangement.

Beneficially the transmission member comprises a shaft and the energy absorber arrangement is arranged to be fitted about the end of the shaft.

In a preferred embodiment the energy absorber arrangement comprises:
  a coiler member;
  an elongate element of a plastically deformable material; and
  a deformer structure;
  the elongate element having a first end attached to the coiler member and a second free end remote from the first end; the elongate element extending past the deformer structure at apposition intermediate the first and second ends; relative rotation of the coiler member and deformer structure causing the elongate element to be drawn past the deformer structure, plastically deforming the elongate element and winding the elongate element coil form about the coiler member.

In such an embodiment, it is preferred that the elongate element is stored in coil form prior to drawing through the deformer structure. Beneficially, the coiler member comprises an inner member arranged for relative rotation with respect to an outer member; the outer member comprising the deformer structure.

In an alternative embodiment, the energy absorber arrangement may comprise a friction disc brake arrangement.

Beneficially, the transmission member comprises a shaft and the shaft extends through from the interior of a housing via a dividing wall in the housing; the housing containing the drum and the speed responsive engagement mechanism, wherein the energy absorber arrangement is mounted onto the shaft externally of the housing separated from the drum and speed responsive engagement mechanism by means of the dividing wall.

As a result of such a construction the drum and the speed responsive engagement mechanism (and the re-spooler mechanism, where present) can be held in a sealed environment which does not need to be disturbed in order to maintain or replace the energy absorber arrangement which lies outside the housing.

Accordingly, a further aspect of the invention provides a safety device for use in a fall arrest system, the safety device comprising:
  an energy absorber arrangement;
  a safety line drum mounted for rotation;
  a speed responsive engagement mechanism responsive to the speed of rotation of the drum, which is activated, above a predetermined rotational speed of the drum;
  a housing containing the drum and the speed responsive engagement mechanism;

a transmission member comprising a shaft capable of rotating with the drum and which extends through from the interior of a housing via a dividing wall in the housing wherein the energy absorber arrangement is mounted onto the shaft externally of the housing separated from the drum and speed responsive engagement mechanism by means of the dividing wall.

Beneficially, the housing is sealed from the environment externally of the housing, a seal being provided for the shaft and the dividing wall.

It is preferred that an enclosure or housing for the energy absorber is provided, this being secured with respect to the housing containing the drum and the speed responsive engagement mechanism.

In a preferred embodiment the speed responsive engagement mechanism comprises a ratchet and pawl mechanism. Beneficially, the ratchet comprises a ratchet disc and there is relative rotation between the ratchet disc and the pawls. In a preferred embodiment the pawls are carried to rotate with the drum.

As mentioned earlier it is preferred that the device further comprises a rewinding (or re-spooling) mechanism arranged to rotate the drum to rewind the safety line onto the drum in the absence of sufficient tension in the safety line to pay out the line.

The invention will now be further described by way of example only and with reference to the accompanying drawings.

DETAILED DESCRIPTION OF THE PREFERRED EMBODIMENT

Figure 1:
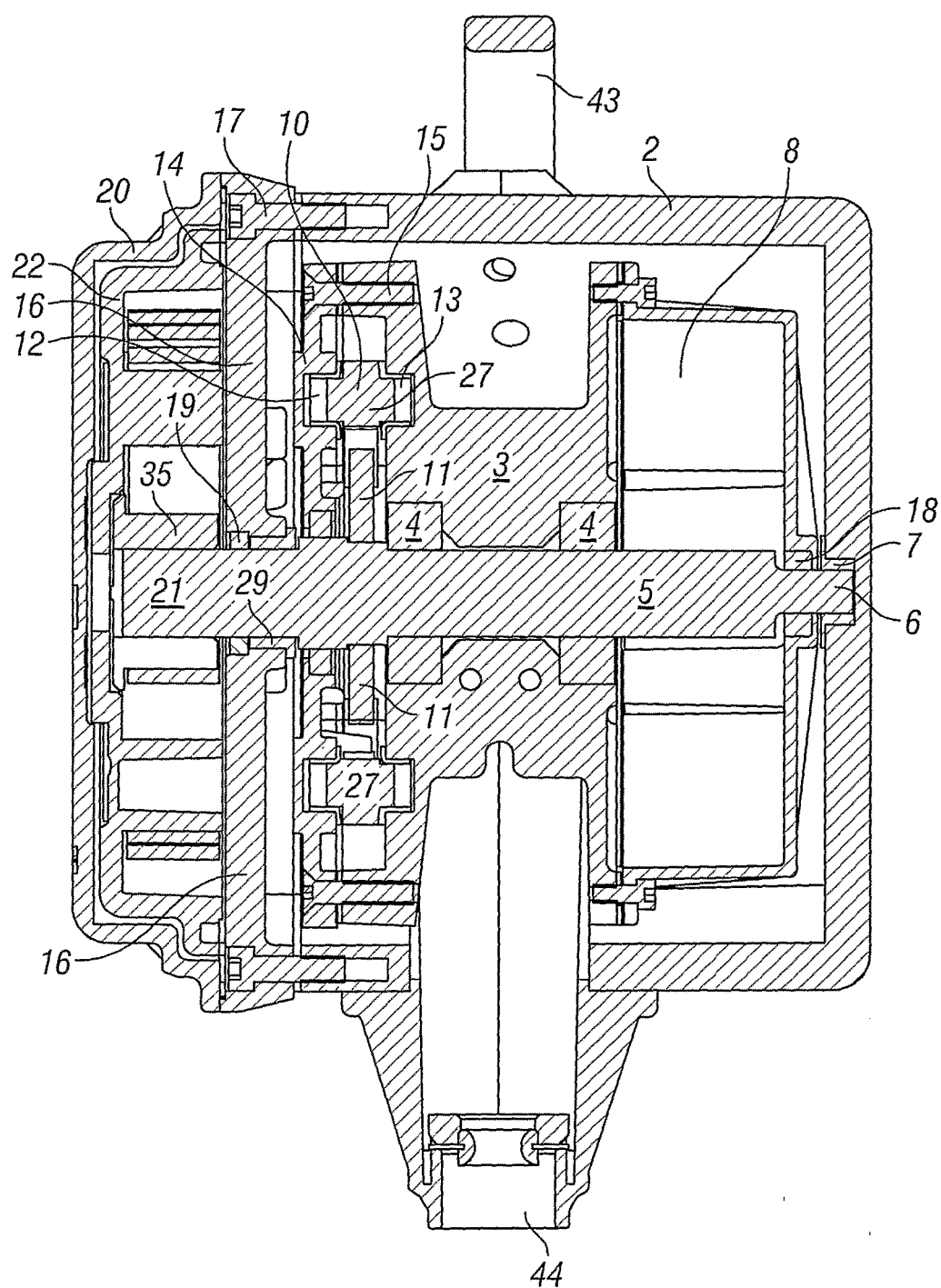
FIG. 1 is a schematic sectional view of a first embodiment of a fall arrest system safety device in accordance with the invention.

Referring to the drawings, and initially to FIG. 1, there is shown a safety device 1 in accordance with the invention having a main housing 2 within which is mounted a shaft 5 and a rotary drum 3 mounted to be able to rotate about the shaft by means of bearings 4. The device includes an attachment eye 43 for suspension from an anchor structure as is known for prior art safety block devices. A safety line wound on the drum passes out of the device via an exit portion 44.

A reduced diameter proximal end 6 of the shaft 5 is held in a tail bearing 7 in the side of the main housing 2.

Within the main housing 2 adjacent and connected to the rotary drum 3 is a rewinding or re-spooling mechanism 8. When a length of safety line is played out from the drum (causing rotation of the drum 3) the rewinding mechanism applies a small torque to the drum 3 causing it to contra-rotate in a direction which tends to rewind the safety line back onto the drum. One preferred type of rewinding mechanism is a coiled spring of the clockspring type. Many suitable rewinding mechanisms are known in the art and will therefore not be described in detail herein. The rewinding mechanism is provided with a shaft bearing 18

Also coupled to the drum at its other side is a speed responsive engagement arrangement comprising a pawl 10 and ratchet 11 arrangement. The pawl and ratchet arrangement may for example be of a type as described in WO2008/007119. The pawls 10 are mounted for rotation with the drum 3 by means of a pivoting boss 27 that is received in a respective boss recess 12, 13 provided in the drum 3 and a facing plate 14 which is fixed to the rotary drum 3 by means of securing bolts 15. The ratchet plate 11 is secured for rotation with the shaft 5. At speeds of rotation of the drum below a predetermined rate the safety line is able to pay out from the drum unabated. In this regime, the pawls 10 rotate with the drum 3 and do not engage the ratchet 11 teeth formations. The ratchet 11 remains fixed to the shaft 5 and the shaft 5 and ratchet 11 do note rotate with the drum 3.

The main housing 2 is closed by an end plate 16 which is bolted to the main housing 2 by means of bolts 17. The distal end 21 of the shaft 5 extends through a bush 29 secured in an axial aperture in the end plate 16. The bush 29 permits rotation of the shaft 5 with respect to the end plate 16 and main housing 2. The distal end of the shaft 5 is D shaped in section, having a flat 28 that provides a keying engagement connection with a connecting coiler member of an energy absorber as will be described. A shaft seal 19 seals the shaft 5. This arrangement ensures that the interior of the main housing 2 is sealed from the exterior environment of the device, even though the shaft extends through the end plate 16 which acts as a dividing wall.

An energy absorber housing 20 is bolted to the main housing 2 and contains an energy absorber cartridge 22 containing an energy absorber strip 23. The energy absorber strip 23 is loaded into the cartridge 22 in un-deployed form. When deployed during a fall arrest event the energy absorber strip is deployed to a deformed state in order to absorb the energy of a fall. This will be described in greater detail herein.

Figure 3:
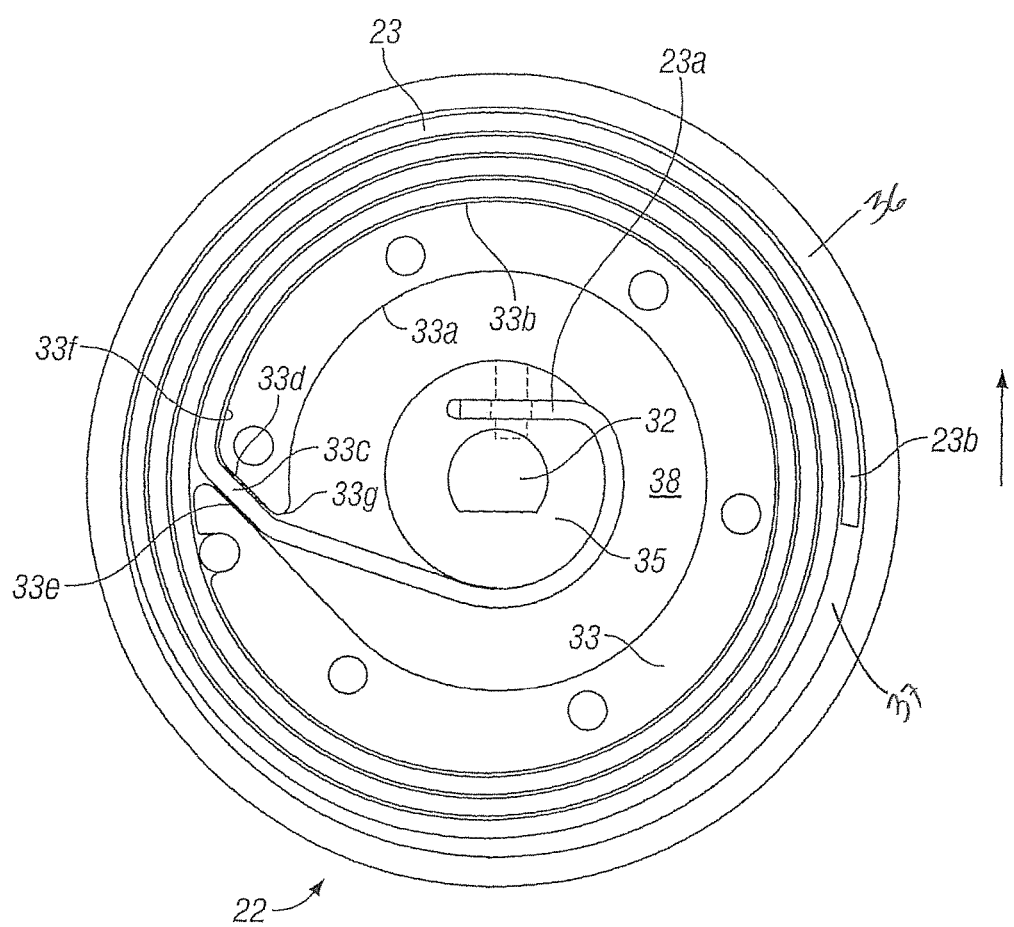
FIG. 3 is a schematic view of a preferred embodiment of the energy absorber arrangement in accordance with the invention.

A preferred embodiment of energy absorber is shown in FIG. 3. The energy absorber cartridge 22 comprises a coiler member 35 and a circular annular deformer ring 33 arranged concentrically about the coiler member 35 and having an inner surface 33a and an outer surface 33b. The coiler member 35 has a central aperture 32 which is D shaped in section in order to engage with the D shaped sectioned distal end 21 of the shaft 5. In this way the shaft 5 and coiler member 35 are keyed to be coupled to drivingly rotationally engage when the absorber cartridge is loaded in position.

The energy absorber strip 23 is arranged to absorb energy in response to relative rotational movement of the shaft 5 and coupled coiler member 35 with respect to the deformer ring 33. In the illustrated embodiment the energy absorber is arranged to absorb energy in response to anti-clockwise rotation of the shaft ends 21 relative to the deformer ring 33.

The energy absorber strip comprises a stainless steel strip 23 having a constant thickness and width along its entire length. In operation, the energy absorber absorbs energy by plastic deformation of the stainless steel strip 23.

The coiler member 35 is provided with a key aperture 32 (in the form of D shaped aperture) for keying and driving engagement with the end 21 of shaft 5. The coiler member 35 is mounted on the shaft end 21 so that the coiler member 35 rotates with the shaft end 21 relative to the deformer ring 33. An annular space 38 is defined between the coiler member 35 and the inner surface 33a of the deformer ring 33. The ring 33 has a deformer slot 33c passing through the ring 33 and oriented tangentially to the inner surface 33a of the ring 33. The slot 33c is slightly wider than the thickness of the strip 34. The slot 33c has a flat clockwise face 33d and a parallel flat anticlockwise face 33e, and the anticlockwise face 33e of the slot 33 is tangential to the inner surface 33a of the ring 33. The slot 33c has a curved entry surface 33f where the clockwise surface 33d of the slot 33c contacts the outer surface 33b of the ring 33 and a curved exit surface 33g where the clockwise surface 33d of the slot 33c contacts the inner surface 33a of the ring 33. The curved entry surface 33f and the curved exit surface 33g are separated by the flat clockwise face 33d.

The strip 23 has a first end 23a secured to the coiler 35 and a free end 23b. The strip 23 passes through the slot 33c, and rest of the strip, ending in the free end 23b, is coiled around the outer surface 33b of the deformer ring 33. An upstanding outer circular wall 36 is provided for the absorber cartridge concentrically about the deformer ring 33 so that an annular strip storage channel 37 is formed between the outer surface 33b of the ring 33 and the wall 36. The wall 36 and the deformer ring 33 stand upwardly from a backplate of the absorber cartridge 22. The absorber cartridge 22 is secured by means of bolts to the end plate 16 of the main housing and provides protection against environmental effects such as weathering or dust.

In a fall arrest event the safety line pays out from the drum 3 at a higher speed than in normal 'safe' pay out situations. Upon the drum 3 rotational speed reaching a predetermined threshold, the ratchet 11 causes the pawl 10 to kick out to a degree such that the pivotally mounted pawls 10 pivot about their pivot bosses 27 beyond a tipping point and become orientated to an engagement position in which the pawl 10 engages with the teeth of the ratchet 11. This is described in detail in WO2008/007119 but in the arrangement described in that document the pawls are fixed with respect to the safety line drum and the ratchet rotates with the safety line drum which is the reverse of the situation described herein. In the teeth engaged position, the drum 3 is effectively coupled to the shaft 5 by means of the pawl 10 engagement with the ratchet 11. Further rotation of the drum 3 therefore causes coupled rotation of the shaft 5 (and the drum 3) in the same direction. Also, the end 21 of the shaft 5 is drivingly coupled to the coiler member 35, which is therefore caused to rotate relative to the deformer ring 33. This relative rotation will wind the stainless steel strip 23 around the coiler member 35 and pull the stainless steel strip 23, coiled in the annular strip storage channel 37, through the deformer slot 33c into the annular space 38. As the strip 23 passes through the slot 33c the strip 23 is plastically deformed and so absorbs energy.

If the energy absorber remained subject to an applied couple greater than the predetermined deployment couple the entire length of the strip 23 would pass through the slot 33c and when the free end 23b of the strip 23 passed through the slot 33c the shaft 5 (and coiler member 35) would be released to rotate freely relative to the ring 33 without any energy being absorbed. In order to prevent this, the annular space 38 defined between the coiler 35 and the inner surface 33a of the ring 33 is arranged to be too small to contain the full length of the strip 23 when the strip 23 is wound around the coiler 35. Thus, the total amount of energy absorbed by the energy absorber is controlled by the size of the annular space 38 and length of the strip 23 which can fit into the annular space 38.

The energy absorber cartridge 22 is loaded with a stainless steel absorber strip 23 in the un-deployed condition, with the end of the strip being connected to the coiler member 35. The absorber cartridge is then fitted into the absorber casing 21, and the casing 21 fitted with the cartridge 22 is then bolted to the end plate 16 connected to the main housing. In so doing, the D shaped aperture 32 of the coiler member 35 is matched up to receive in arrangement the D shaped sectioned distal end 21 of the shaft 5. In this way the shaft 5 and the coiler member 35 are keyed to be coupled to drivingly rotationally engage when the absorber cartridge is loaded in position. The absorber holds the shaft 5 against rotation up to application of a predetermined torque or couple after which the shaft 5 is able to rotate with respect to the tail bearing 7 until the strip 23 is deployed to its maximum extent.

As a result, following deployment of the energy absorber as a result of a fall arrest event, the energy absorber can be easily replaced by means of removing the absorber casing 21, removing the spent cartridge 22, replacing the cartridge by fitting a replacement cartridge and re-securing in position the absorber casing 21. All of this can be achieved without disturbing any other working components of the device which remain sealed off in the main housing 2 closed by the face plate 16 acting as a dividing wall through which the shaft end 21 extends.

Figure 2:
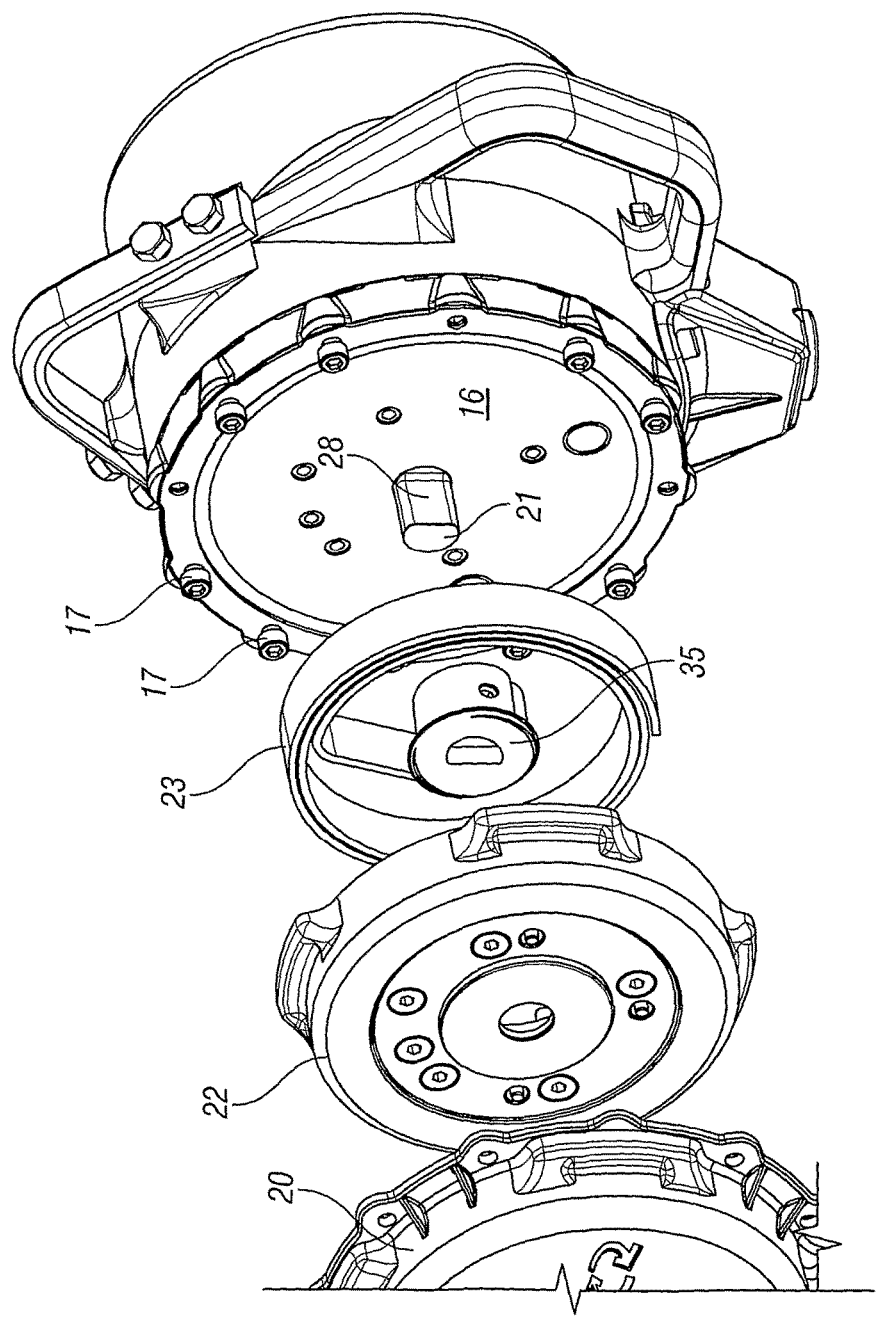
FIG. 2 is an exploded perspective view of the device of FIG. 1.

In the embodiment of FIGS. 1 to 3, the shaft 5 is held from rotation by the positioning of the energy absorber in place. The shaft 5 is therefore able to rotate until the absorber is positioned in place. This permits the re-spooling spring mechanism 8 to be tensioned by rotation of the shaft 5, before the shaft is fixed by fitting the absorber cartridge 22 in position. Following a fall event and deployment of the energy absorber, it is necessary to replace the absorber. When the energy absorber is removed for replacement, there is nothing to prevent the shaft 5 from rotating under the influence of the re-spooling spring mechanism 8 which unwinds (becomes de-energised). This means that it is necessary to re-energise the re-spooling spring mechanism 8, each time the energy absorber is replaced. This adds a degree of complexity to changing over to replace a spent absorber cartridge.

Figure 7:
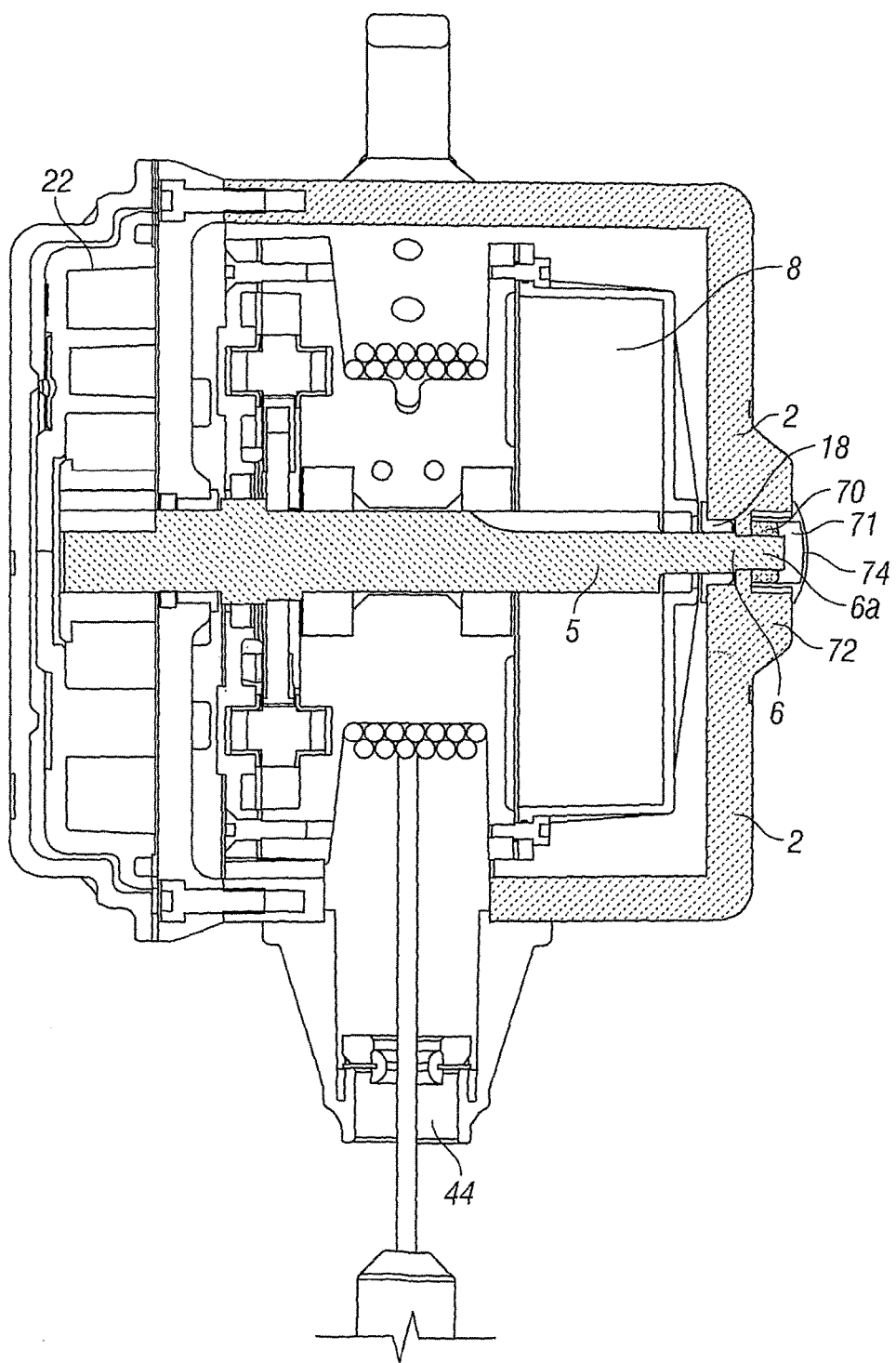
FIG. 7 is a schematic sectional view of an embodiment similar to the embodiment of FIG. 1 with a recoil brake arrangement.

In the embodiment of FIG. 7, the proximal end 6 of the shaft 5 is extended through the bearing 18 and provided with a threaded end 6a. A threaded nut 70 is fastened to the threaded end 6a of the shaft 5. Before replacing the cartridge 22 following a deployment event, the nut 70 is tightened against the outer casing 2 to secure the shaft 5 relative to the casing 2. This allows the absorber/cartridge to be replaced without unwinding/de-energising of the re-spooler spring mechanism 8. The nut 70 is positioned in a recess 71 provided in an enlarged boss 72 of the casing, and a sealing cap 74 is provided. This prevents exposure of the arrangement which could lead to corrosion in hostile environmental conditions. The clamping of the shaft 5 using the nut 70 does not hinder deployment of the energy absorber 23 during a fall event. The thread on the shaft end 6a and the nut 70 is arranged to be in a rotational sense that as the shaft rotates during a deployment event (causing the absorber coil 23 to be pulled through the absorber casing) the nut 70 unscrews on the threaded shaft end 6a. This ensures that the absorber performance is not interrupted or interfered with.

Figure 4:
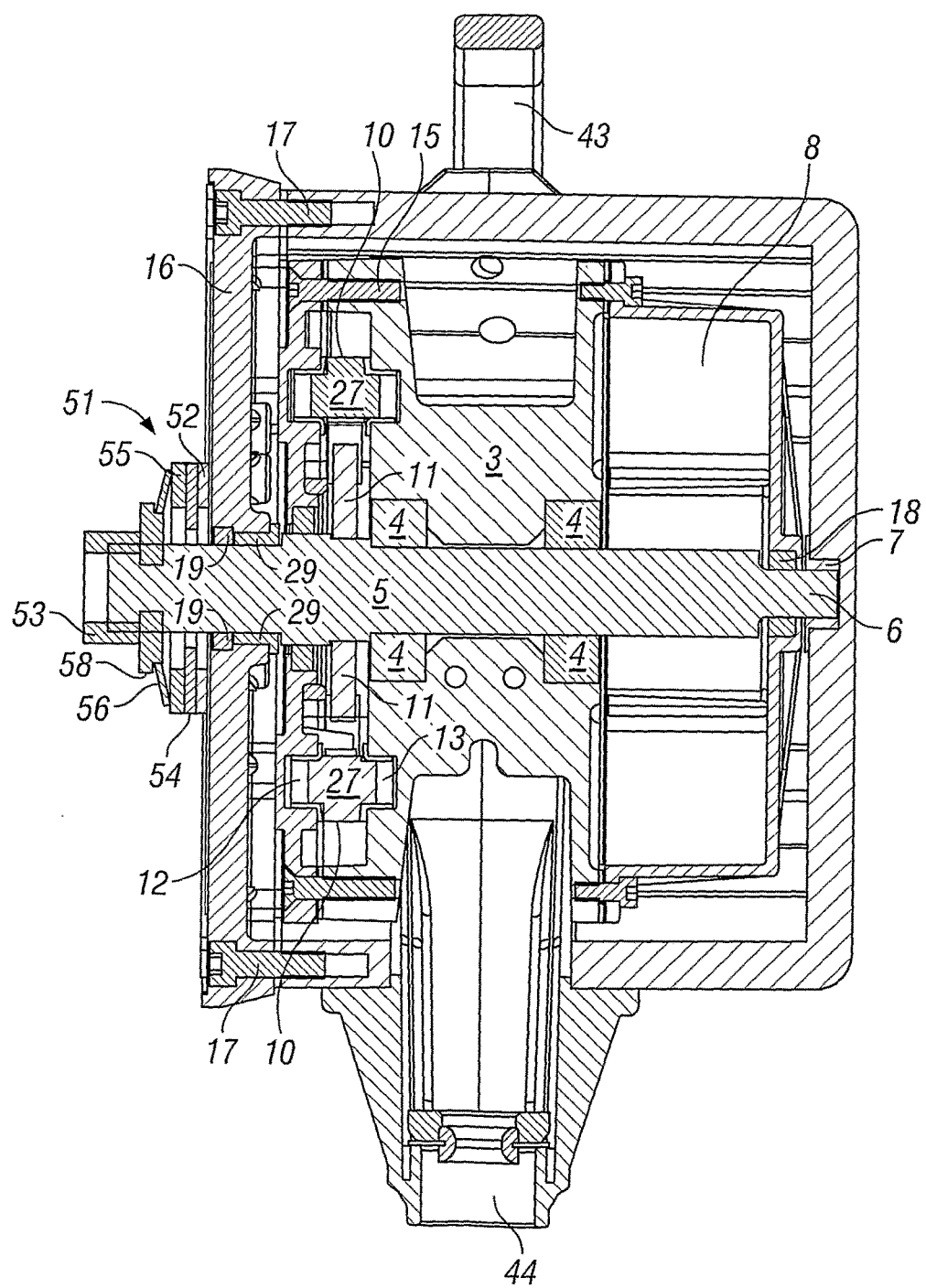
FIG. 4 is a schematic sectional view of a second embodiment of a fall arrest system safety device in accordance with the invention.
Figure 5:
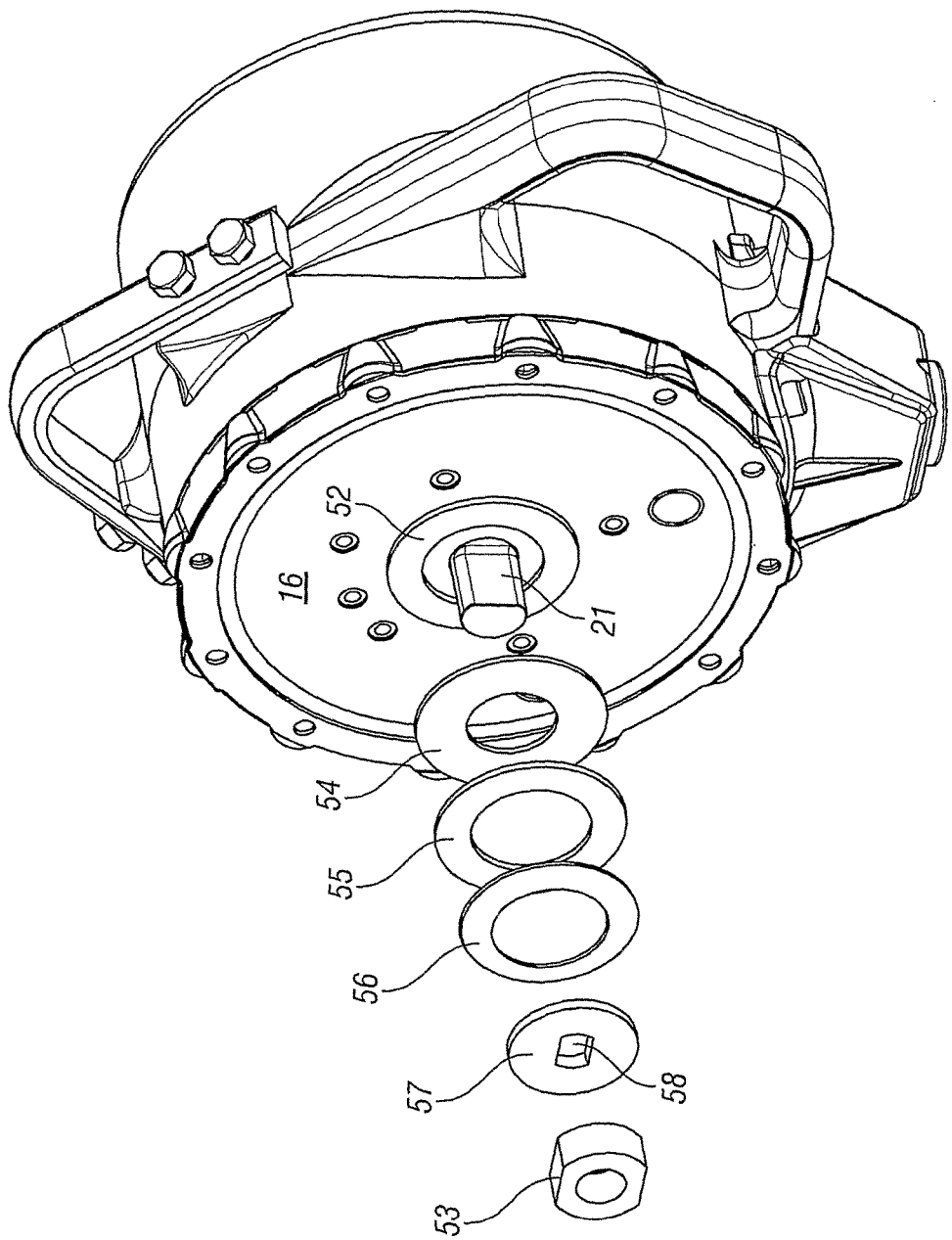
FIG. 5 is an exploded perspective view of the device of FIG. 4.
Figure 6:
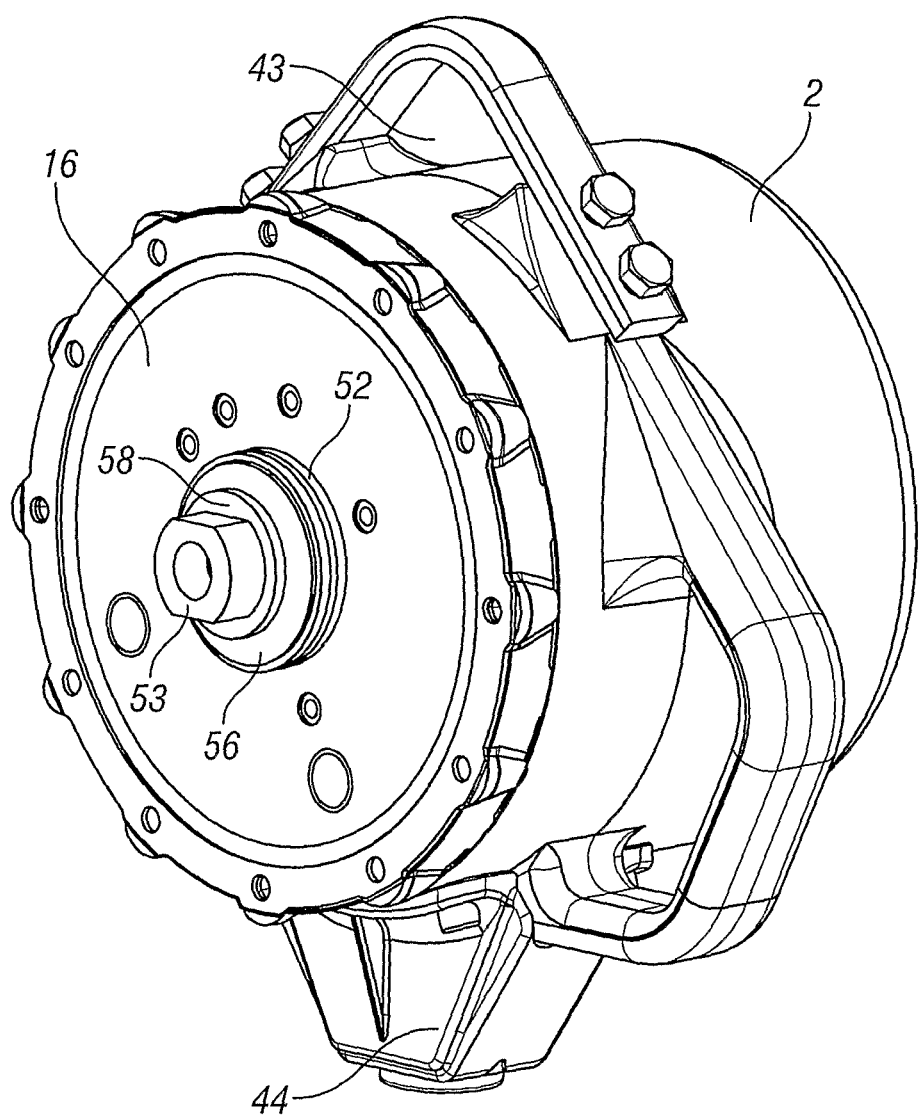
FIG. 6 is a perspective view of the embodiment of FIGS. 4 and 5.

In an alternative embodiment shown in FIGS. 4 to 6, the concept of the present invention is realised using an alternative embodiment of energy absorber. In this arrangement the components of the device are identical to those of the first described embodiment having regard to all items enclosed within the housing 2 and face plate 16. In this embodiment however the energy absorber cartridge 22 and coil stored energy absorber strip arrangement 23 is replaced with an alternative-form energy absorber comprising a friction brake arrangement 51.

The friction brake arrangement 51 comprises a first annular friction disc 52 secured to the outer surface of the end plate 16 and through which the distal end 21 of shaft 5 extends. In this arrangement the distal end 21 of shaft 5 has an external thread for engaging with a threaded bore of tightening nut 53. It will be appreciated that the disc 52 being fixed with respect to the end plate 16 cannot rotate with the shaft end 21. Two further annular friction brake discs 54 55 are mounted over the end of the shaft and a frustoconical compression energiser spring 56 is mounted between a keyed drive disc 57 and the brake disc 55. The drive disc 55 includes a flat sided key slot 58 for fitting over the D shaped distal end 21 of shaft 5, for engagement with the shaft, such that rotation of the shaft 5 causes rotation of the drive disc 57. The threaded nut 53 is tightened onto the threaded end 21 of shaft 5 up to a predetermined torque. This causes the drive disc 57 to compress the spring 56 against the disc 55 in order to energise the brake arrangement. In operation, as in the previous embodiment, in the event of a fall arrest event the safety line pays out from the drum 3 at a higher speed than in normal 'safe' pay out situations. Upon the drum 3 rotational speed reaching a predetermined threshold, the ratchet 11 causes the pawl 10 to kick out to a degree such that the pivotally mounted pawls 10 pivot about their pivot bosses 27 beyond a tipping point and become orientated to an engagement position in which the pawl 10 engages with the teeth of the ratchet 11. In the teeth engaged position, the drum 3 is effectively coupled to the shaft 5 by means of the pawl 10 engagement with the ratchet 11. Further rotation of the drum 3 therefore causes coupled rotation of the shaft 5 (and the drum 3) in the same direction. Also, the end 21 of the shaft 5 is drivingly coupled to the drive disc 57 and rotation of the drive disc causes rotation of the brake discs 52, 54, 55 relative to one another in a friction brake action. This absorbs energy during the fall arrest event.

The brake disc arrangement 51 can be sealed from the environment in a similar manner to the sealing of the coil energy absorber of the first embodiment, by means of a housing similar to housing 20 bolted (or otherwise secured) to the main housing 2 or the face plate 16. In common with the first described embodiment, following a fall arrest event and usage of the friction brake arrangement 5 to absorb the energy of the fall, the fiction brake components can be conveniently and easily accessed in order to replace the components and re-tighten the arrangement to the required torque. It is important to ensure that the tightening torque is at the predetermined level in order to ensure that the correct energy absorption occurs during the fall arrest event.

The invention claimed is:

1. A safety device for use in a fall arrest system, the safety device comprising:
    a main housing with an end wall that houses a rotatable drum, a rotatable shaft and a speed responsive engagement mechanism, wherein the rotatable drum supports a safety line wound thereon and is configured to rotate about the shaft in response to unwinding of the safety line, wherein the speed responsive engagement mechanism is configured to rotate the shaft in unison with the drum when rotational speed of the drum exceeds a predetermined rotational speed, and wherein the shaft extends within the main housing and through the end wall to one end of the shaft disposed beyond the end wall; and
    a replaceable cartridge including a coiler member and a plastically deformable strip, wherein the coiler member has a first configuration where the coiler member is removably connected to the one end of the shaft such that the coiler member rotates with the shaft, wherein the coiler member has a second configuration where the coiler member is disconnected from the one end of the shaft for replacing the replaceable cartridge without disturbing the rotatable drum and the speed responsive engagement mechanism housed within the main housing, wherein the plastically deformable strip has a first end secured to the coiler member and a second free end remote from the first end, and wherein the plastically deformable strip is configured to deploy from a coiled condition and plastically deform and wrap around the coiler member as the shaft rotates in order to absorb energy as the shaft rotates.

2. The safety device according to claim 1, wherein:
the speed responsive engagement mechanism is mounted on the shaft intermediate the drum and the end wall.

3. The safety device according to claim 1, wherein:
the drum has a first configuration different from a second configuration;
wherein, in the first configuration of the drum, the drum rotates independently of and about the shaft; and
wherein, in the second configuration of the drum, the drum rotates in unison with the shaft.

4. The safety device according to claim 1, wherein:
the replaceable cartridge further comprises a deformer structure, wherein the plastically deformable strip extends past the deformer structure at a position intermediate the first and second ends, and wherein relative rotation of the coiler member and deformer structure causes the plastically deformable strip to be drawn past the deformer structure as well as plastic deformation of the plastically deformable strip and winding of the plastically deformable strip in a coil about the coiler member.

5. The safety device according to claim 4, wherein:
a part of the plastically deformable strip is stored in the coiled condition in a storage channel disposed outward the deformer structure.

6. The safety device according to claim 4, wherein:
the coiler member comprises an inner member configured to rotate relative to an outer member which includes the deformer structure.

7. The safety device according to claim 1, further comprising:
a seal provided between the shaft and the end wall.

8. The safety device according to claim 1, wherein:
the speed responsive engagement mechanism includes a ratchet and a pawl.

9. The safety device according to claim 8, wherein:
the ratchet includes a plate, and the plate is rotatable relative to the pawl.

10. The safety device according to claim 9, wherein:
the pawl is rotatable with the drum.

11. The safety device according to claim 1, further comprising:

a rewinding mechanism configured to rotate the drum to rewind the safety line onto the drum in absence of sufficient tension in the safety line to pay out the safety line.

12. The safety device according to claim 1, further comprising:
locking means actuatable to secure the shaft against rotation in a first direction, but to permit rotation in an opposite direction.

13. The safety device according to claim 12, wherein:
the locking means permits rotation of the shaft in a direction which effects deployment of the plastically deformable strip.

14. The safety device according to claim 12, wherein:
the locking means comprises a threaded nut threaded onto a threaded portion of the shaft.

15. The safety device according to claim 14, wherein:
the nut tightens onto the main housing.

16. The safety device according to claim 14, wherein:
rotation of the shaft in a direction which effects deployment of the plastically deformable strip causes the nut to loosen from a tightened position.

17. In a fall arrest system that includes a main housing with an end wall that houses a rotatable drum, a rotatable shaft and a speed responsive engagement mechanism, wherein the rotatable drum supports a safety line wound thereon and is configured to rotate about the shaft in response to unwinding of the safety line, wherein the speed responsive engagement mechanism is configured to rotate the shaft in unison with the drum when rotational speed of the drum exceeds a predetermined rotational speed, and wherein the shaft extends within the main housing and through the end wall to one end of the shaft disposed beyond the end wall, a replaceable cartridge comprising:
a coiler member and a plastically deformable strip, wherein the coiler member has a first configuration where the coiler member is removably connected to the one end of the shaft such that the coiler member rotates with the shaft, wherein the coiler member has a second configuration where the coiler member is disconnected from the one end of the shaft for replacing the replaceable cartridge without disturbing the rotatable drum and speed responsive engagement mechanism housed within the main housing, wherein the plastically deformable strip has a first end secured to the coiler member and a second free end remote from the first end, and wherein the plastically deformable strip is configured to deploy from a coiled condition and plastically deform and wrap around the coiler member as the shaft rotates in order to absorb energy as the shaft rotates.

18. In the fall arrest system according to claim 17, wherein:
the replaceable cartridge further comprises a deformer structure, wherein the plastically deformable strip extends past the deformer structure at a position intermediate the first and second ends, and wherein relative rotation of the coiler member and deformer structure causes the plastically deformable strip to be drawn past the deformer structure as well as plastic deformation of the plastically deformable strip and winding of the plastically deformable strip in a coil about the coiler member.

19. In the fall arrest system according to claim 18, wherein:
a part of the plastically deformable strip is stored in the coiled condition in a storage channel disposed radially outward from the deformer structure.

20. In the fall arrest system according to claim 18, wherein:
the coiler member comprises an inner member configured to rotate relative to an outer member which includes the deformer structure.

21. A safety device for use in a fall arrest system, the safety device comprising:
a main housing with an end wall that houses a rotatable drum, a rotatable shaft and a speed responsive engagement mechanism, wherein the rotatable drum supports a safety line wound thereon and is configured to rotate about the shaft driven by unwinding of the safety line, wherein the speed responsive engagement mechanism is configured to rotate the shaft in unison with the drum when rotational speed of the drum exceeds a predetermined rotational speed, and wherein the shaft extends within the main housing and through the end wall to one end of the shaft disposed beyond the end wall;
a replaceable cartridge including a coiler member and a plastically deformable strip, wherein the coiler member has a first configuration where the coiler member is removably connected to the one end of the shaft such that the coiler member rotates with the shaft, wherein the coiler member has a second configuration where the coiler member is disconnected from the one end of the shaft for replacing the replaceable cartridge without disturbing the rotatable drum and the speed responsive engagement mechanism housed within the main housing, wherein the plastically deformable strip has a first end secured to the coiler member and a second free end remote from the first end, and wherein the plastically deformable strip is configured to deploy from a coiled condition and plastically deform and wrap around the coiler member as the shaft order to absorb energy as the shaft rotates; and
a rewinding mechanism configured to rotate the drum to rewind the safety line onto the drum in absence of sufficient tension in the safety line to pay out the safety line.

* * * * *